March 15, 1966 R. SUHRMANN 3,241,051

DEFLECTION TRANSFORMER SYSTEM FOR TELEVISION RECEIVERS

Filed Feb. 26, 1962

INVENTOR
ROBERT SUHRMANN

BY Frank R. Jufari
AGENT

United States Patent Office 3,241,051
Patented Mar. 15, 1966

3,241,051

DEFLECTION TRANSFORMER SYSTEM FOR TELEVISION RECEIVERS

Robert Suhrmann, Hamburg-Rahlstedt, Germany, assignor to North American Philips Company, Inc., New York, N.Y., a corporation of Delaware Filed Feb. 26, 1962, Ser. No. 175,490
Claims priority, application Germany, Apr. 14, 1961, P 26,969
12 Claims. (Cl. 323—61)

Figure 1:
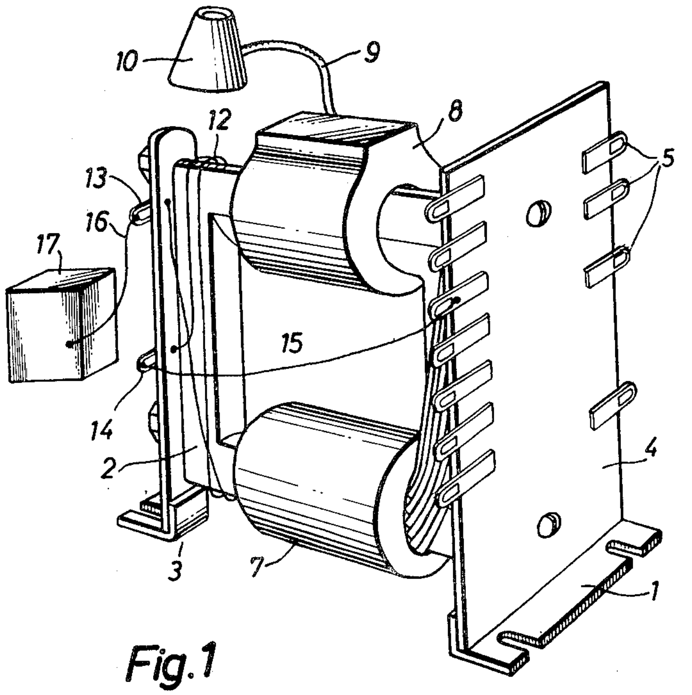

The invention relates to a television receiver having a deflection transformer tuned by means of the leakage inductance to a harmonic of the flyback oscillation frequency and provided with an auxiliary winding in which an oscillation voltage is induced which substantially corresponds to the said harmonic. This latter oscillation may be used in a compensating circuit to obtain a flyback oscillation voltage (flyback pulse) from which the said harmonic is at least substantially removed.

A system utilizing such harmonic tuning is described in U.S. Patent No. 2,805,384, and is frequently used in particular to avoid interference oscillations and to obtain a high peak value of the high tension voltage at the secondary winding, but it involves the occurrence of a harmonic, usually the third harmonic, of the flyback pulse which, as is known, corresponds substantially to a sine half-wave. The present invention is an improvement over the system described in the aforesaid U.S. patent.

Since the harmonic has a considerable amplitude, the flyback pulse is markedly distorted. The harmonic is set up at the primary winding or another winding separated from the secondary so as to produce perceptible saddle distortion of the flyback pulse. This may be undesirable, especially if the flyback pulse is applied to a phase comparison stage for synchronizing the line deflection circuits. This shows itself particularly if differentiation is effected, i.e. from a truly sinusoidal half-wave a cosine half-wave is obtained having a substantially linear edge near the passage through zero. However, if a harmonic is present the differentiated curve has large amplitude variations (humps) near the zero value, and may even change the sign of its slope. Such an altered edge is not suited to ensure faultless operation in a phase discriminator.

To avoid this drawback a circuit arrangement of the kind referred to above has been proposed in which an additional winding is disposed in the leakage field of the high voltage secondary winding of a line deflection transformer and is connected between earth and the point at which the pulse to be supplied to the phase comparison circuit is derived. This arrangement is based on the theory that an oscillation voltage substantially comprising harmonics only is set up in the additional winding. This harmnoic oscillation can be combined with the flyback oscillation, which is distorted by the same harmonic, in such a way that a pure flyback pulse from which the harmonic can be removed is supplied to the phase comparison circuit. However, in the arrangement proposed, the winding arranged in the leakage field is spaced from the core by a comparatively large distance and hence disposed at a point at which the leakage field is very weak. Consequently, a comparatively large and hence expensive coil is required to achieve the necessary amplitude of the compensating voltage. Furthermore, the coil has a comparatively low impedance, resulting in an inadmissible loading of the parallel connected winding of the deflection transformer so that the circuit arrangement will not always operate satisfactorily. In addition, at the location of the additional winding, the leakage field is highly dependent upon circuit components arranged in the proximity, necessitating additional balancing to achieve satisfactory compensation.

In accordance with the invention, a television receiver is provided comprising a deflection transformer tuned by means of its leakage inductance to a harmonic of the flyback oscillation. The transformer is provided with an auxiliary winding in which an oscillation substantially corresponding to the harmonic is produced, enabling an oscillation to be obtained from which the harmonic is substantially removed. The above mentioned disadvantages are avoided and satisfactory compensation can be achieved whereby a pure flyback pulse is obtained by providing the additional winding upon the transformer core so that it substantially does not embrace the main magnetic flux. Thus the auxiliary winding has a ferro-magnetic core and hence a suitable impedance and may moreover be provided in a simple manner.

To obtain the flyback oscillation from which the harmonic is at least substantially removed, the auxiliary winding is advantageously connected in series with the primary of the transformer, or a part thereof. Thus, the desired satisfactory compensation of the harmonic from the flyback oscillation is achieved with very little additional loading effect.

Figure 2:
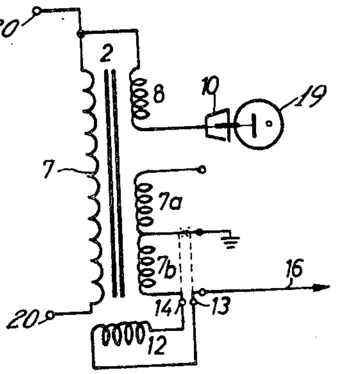

In order that the invention may readily be carried into effect, an embodiment thereof will now be described, by way of example, with reference to the accompanying diagrammatic drawings, in which:

FIGURE 1 is a perspective view of a line deflection transformer of a television receiver, and FIGURE 2 is the circuit diagram thereof.

Referring now to FIGURE 1, a ferrite core 2 constituted of substantially bar-shaped parts arranged so as to form a closed rectangle is secured to an angle support 1. The other end of the core 2 is supported by another angle support 3. The support 1 carries an insulating plate 4 on which are mounted soldering lugs 5 for the connections of the windings of the transformer.

A primary winding 7 is provided on the lower cross member of the ferrite core 2. In addition to its end terminals 20, winding 7 may have one or more tappings, not shown. The terminals and tappings of the winding are connected to the soldering lugs 5 on the insulating plate 4. The winding 7 may comprise a number of discrete parts. On the upper cross member of the rectangular core is provided a high-voltage secondary 8 having a terminal 9 which may be connected with the aid of a cap 10 to the anode of a high voltage rectifier or the like, not shown.

As described in the aforesaid U.S. patent, in order to avoid interference oscillations in the deflection circuits of a television receiver, and to improve the high-voltage amplitude, the network comprising the windings 7 and 8 of the deflection transformer and the leakage inductance set up between them and the capacitances produced both in the primary and in the secondary are tuned to approximately 15 kc., which is the fundamental oscillation frequency of the flyback of the sawtooth current produced in the deflection device, and also approximately to the third harmonic thereof.

On the left-hand ends of the upper and lower cross members is provided an auxiliary winding 12 embracing the left-hand longer side of the rectangular core. The terminals of said winding are connected to soldering tags 13 and 14, respectively, mounted in an insulated manner on the support 3. As can be seen from FIG. 1, winding 12 comprises a first portion partially surrounding the lower horizontal leg of the transformer core and a second portion partially surrounding the upper horizontal leg of the transformer core. As will be evident, in each of these portions there are induced voltages having a fundamental frequency component and a harmonic frequency component. It will be evident from FIG. 1 that since the winding 12 is wound to include two opposite leg portions of the core, at any instant of time the main magnetic flux flowing in the ferrite core member 2 cuts the lower and upper portions of winding 12 in opposite directions thereby inducing approximately equal and opposite voltages in the ends of winding 12. Therefore, winding 12 can be considered to be the equivalent of two separate windings applied to the core in series opposition with the result that the fundamental frequency components of voltage induced in winding 12 by the main flux will be cancelled leaving only the harmonic frequency component of voltage at the output of the winding.

FIGURE 2 is a circuit diagram of the deflection transformer of FIGURE 1, similar reference characters relating to like parts. The primary winding 7 proper is preferably connected by means of input terminals 20 in the circuit of a controlled amplifying element, not shown, for example, a thermionic tube or a transistor having a control electrode to which a sawtooth voltage is supplied. The deflection coils may be connected to windings *7a* and *7b* coupled tightly to the primary winding 7. Between the winding 7 and the high-voltage secondary 8 there is a considerable leakage inductance by means of which the transformer is tuned in the above described manner to said harmonic of the flyback oscillation. One end of the high-voltage winding 8 is connected to the primary 7 and the other end to a cap 10 which may be mounted on a rectifier valve 19.

A flyback pulse on which the harmonic is superimposed is set up in the windings *7a* and *7b* also. With the aid of the auxiliary winding 12 which embraces the stray flux, a voltage is induced therein which substantially corresponds to the harmonic only. A terminal 14 of the auxiliary winding 12 is connected by a lead 15 to one end of the winding *7b*. The other end of winding *7b* is connected to earth. If the number of turns of windings 12 and *7b* are correctly chosen and the windings are connected so that the harmonic frequency components cancel one another, there is produced at a point 13 substantially complete compensation of the harmonic frequency so that through a lead 16 there may be applied to a deflector device 17 (FIGURE 1), or other suitable stage, a voltage (or a current) which substantially corresponds to the pure fundamental flyback oscillation. The relative number of turns of windings 12 and *7b* may be determined empirically. The oscillation may suitably pass in known manner from a terminal 16 through a differentiating network which may be mounted on the transformer, for example, on the plate 4 or the support 3.

The auxiliary winding 12 may alternatively be connected in series with another terminal of the windings *7a* and *7b*, for example, it may be connected between a tapping and earth. Thus compensation of the third harmonic is obtained at one winding and amplification at the other winding, and this may be desirable for many applications.

What is claimed is:

1. A circuit arrangement for generating deflection currents for a cathode ray tube device comprising a trace period of a first duration and a retrace period of a second duration, said arrangement comprising a transformer having a magnetic core for providing a main magnetic flux path, first and second winding means arranged on said core so as to provide a substantial leakage flux therebetween, said leakage flux imparting leakage inductance to said transformer, said first winding means comprising an input terminal adapted for connection to a source of deflection energy for supplying a periodically interrupted current flow in said first winding means whereby a flyback pulse is induced therein having a fundamental oscillation frequency and a harmonic thereof, said transformer being tuned by means of said leakage inductance approximately to said harmonic of said fundamental oscillation frequency, an auxiliary winding positioned on said core to link with a portion of said leakage flux and to be substantially free of any linkage with said main magnetic flux whereby a voltage is induced therein of said harmonic frequency, and means for coupling said auxiliary winding to a portion of said first winding means so as to combine the voltages produced in said auxiliary winding and first winding means in a sense to produce a resultant voltage of said fundamental frequency wherein the harmonic frequency components of voltage are substantially cancelled.

2. A circuit arrangement for generating deflection currents for a cathode ray tube device having a trace period of a first duration and a retrace period of a second duration, said arrangement comprising a transformer having a magnetic core, first and second winding means arranged on said core so as to provide a predetermined leakage flux therebetween, said leakage flux imparting leakage inductance to said transformer, said first winding means comprising a first winding portion and a second winding portion, input means for supplying a periodically interrupted current flow in said first winding portion whereby a flyback oscillation pulse is induced in said first winding means having a fundamental frequency component and a harmonic frequency component, said transformer being tuned by means of said leakage inductance approximately to said harmonic frequency, an auxiliary winding mounted on said core in spaced apart relationship to said first and second winding means so as to be in close mutual coupling relationship with said leakage flux and in loose coupling relationship with the main magnetic flux in said core whereby a voltage of substantially said harmonic frequency only is induced in said auxiliary winding, and means for combining the voltages produced in said auxiliary winding and said second winding portion in a sense such that a resultant voltage is produced in which said harmonic frequency components of voltage are substantially cancelled.

3. Apparatus as described in claim 2 wherein said harmonic frequency voltage is approximately the third harmonic of said retrace period frequency.

4. A television deflection circuit comprising a transformer, said transformer comprising a rectangular shaped magnetic core member providing a main magnetic flux path, first and second winding means arranged on said core so as to provide a substantial leakage flux therebetween, said leakage flux imparting leakage inductance to said transformer, said first winding means winding having a first winding portion adapted for connection to a source of deflection energy and a second winding portion adapted for connection to a deflection winding said deflection source being arranged to supply a periodically interrupted current flow in said first winding means having a flyback period, said first winding means having a voltage induced therein during said flyback period having frequency components comprising a predetermined flyback oscillation frequency and a harmonic thereof, an auxiliary winding wound around one leg of said core in a direction substantially parallel to the direction of main magnetic flux flowing therein, said auxiliary winding being energized by said leakage flux and having an oscillation voltage induced therein of substantially said harmonic frequency, and means for coupling said auxiliary winding to the second winding portion of said first winding means so as to combine the voltages induced in said second winding portion and said auxiliary winding in a sense to produce a resultant voltage substantially free of said harmonic frequency component.

5. Apparatus as described in claim 4 wherein said core member comprises first and second parallel legs and third and fourth legs perpendicular to said first and second legs, said first and second winding portions being wound about said core member in close mutual coupling relationship, said first winding portion being wound about said first leg of said core member and said second winding means being wound about said second leg of said core member, said auxiliary winding being wound in the lengthwise direction about said third leg of said core member, said auxiliary winding being connected in series opposition with said second winding portion thereby to provide a resultant voltage substantially free of said harmonic frequency component.

6. A television deflection circuit comprising a transformer having a magnetic core providing a path for the main magnetic flux of said transformer, a primary winding, a secondary winding and a high voltage winding provided on said core, said windings being arranged on said core to provide a leakage flux which imparts a leakage inductance to said transformer, said primary winding and said secondary winding being in close mutual coupling relationship, input means for supplying a periodically interrupted current flow in said primary winding having a flyback period, said primary and secondary windings each having a voltage induced therein having frequency components comprising a fundamental flyback oscillation frequency and a harmonic frequency thereof, said transformer being tuned by means of said leakage inductance approximately to said harmonic of the flyback oscillation frequency, an auxiliary winding wound on said core so as to embrace said leakage flux and in relatively loose mutual magnetic coupling relationship with said main magnetic flux whereby an oscillation voltage is induced therein of said harmonic frequency and which is substantially devoid of said fundamental flyback oscillation frequency, and means for connecting said auxiliary winding in series opposition with said secondary winding thereby to provide a resultant voltage substantially free of said harmonic frequency component.

7. Apparatus as described in claim 6 wherein said auxiliary winding is connected between a tap on said secondary winding and a point of reference potential and in a sense whereby the induced harmonic frequency component of voltage in said auxiliary winding opposes the harmonic frequency component of voltage induced in one portion of said secondary winding and aids the harmonic frequency component of voltage induced in a second portion of said secondary winding, and first and second output terminals connected to said first and second portions of said secondary winding, respectively, to supply first and second resultant voltages thereat having a minimum harmonic frequency component and a maxinum harmonic frequency component, respectively.

8. A circuit arrangement for generating deflection currents for a cathode ray tube device comprising a transformer having a magnetic core defining a main flux path, first and second winding means arranged on said core so as to provide a substantial leakage flux therebetween, said leakage flux imparting leakage inductance to said transformer, said first winding means having an input section and an output section, input means for supplying a periodically interrupted current flow in said first winding means having a flyback period, said first winding means having a flyback voltage induced therein during said flyback period having frequency components comprising a fundamental flyback oscillation frequency and a harmonic frequency thereof, said transformer being tuned by means of said leakage inductance approximately to said harmonic of the flyback oscillation frequency produced in said windings during said flyback period, means for correcting distortion in the flyback voltage produced comprising an auxiliary winding mounted on said core so that the voltage induced in a portion of said winding due to the main core flux of the fundamental flyback oscillation frequency substantially cancels a similar induced voltage in another portion of said auxiliary winding whereas the voltages of said harmonic frequency induced in each of said portions of the auxiliary winding energized by said leakage flux are additive, whereby the total induced voltage in said auxiliary winding is substantially free of said fundamental flyback oscillation frequency, and means for connecting said auxiliary winding in series opposition with a part of the output section of said first winding means whereby the harmonic frequency components of voltage substantially cancel each other.

9. Apparatus for producing a sawtooth deflection current in a cathode ray tube deflection coil, said apparatus comprising a transformer having a core of magnetic material defining a main magnetic flux path, winding means provided on said core and comprising a first winding portion and a second winding portion, said transformer having a leakage inductance determined by the leakage flux occurring between the windings of said transformer, input means coupled to said first winding portion for supplying a periodically interrupted current flow thereto whereby a flyback pulse is induced therein having a given fundamental flyback oscillation frequency and a harmonic frequency thereof, said transformer being tuned by means of said leakage inductance approximately to said harmonic frequency, an auxiliary winding wound on said core so as to comprise first and second effective winding portions, each of said first and second effective winding portions having induced therein a voltage having a component at said fundamental oscillation frequency and a component at said harmonic frequency, said first and second winding portions being effectively connected in series opposition so that said fundamental frequency components cancel one another thereby to produce a voltage across said auxiliary winding substantially of said harmonic frequency only, and means for coupling said auxiliary winding with said second winding portion of said winding means to produce a resultant output voltage wherein the harmonic frequency components of the voltages produced in said windings are substantially cancelled.

10. Apparatus for producing a sawtooth deflection current having a flyback period for a cathode ray tube system, said apparatus comprising a transformer having a magnetic core composed of a plurality of legs defining a main magnetic flux path, first and second winding means wound on different legs of said core so as to provide a leakage flux which imparts a leakage inductance to said trnasformer, said first winding means compirsing a first winding portion and a second winding portion, input means coupled to said first winding portion for supplying a periodically interrupted current flow in said first winding portion whereby a flyback pulse is induced in said first and second winding means having a component of a given fundamental flyback oscillation frequency and a component of a harmonic frequency thereof, said transformer being tuned by means of said leakage inductance approximately to said harmonic frequency, an auxiliary winding wound on still another leg of said core in loose magnetic coupling relationship with said primary and secondary windings, said auxiliary winding being positioned on said core so that a voltage of substantially zero net fundamental frequency component is induced therein and wherein the harmonic frequency components are additive to produce a net induced voltage of substantially said harmonic frequency component, and means for connecting said auxiliary winding in series opposition with said second winding portion to produce a resultant voltage of said fundamental frequency having a minimum harmonic frequency component.

11. Apparatus for producing a sawtooth deflection current having a flyback period for a cathode ray tube system, said apparatus comprising a transformer having a magnetic core, first and second winding means wound on said core so as to provide a leakage flux which imparts a leakage inductance to said transformer, said first winding means comprising a first winding portion and a second winding portion having a tap which divides said second winding portion into third and fourth winding portions, first and second output terminals connected to said third and fourth winding portions, respectively, input means coupled to said first winding portion for supplying a periodically interrupted current flow in said first winding portion whereby a flyback pulse is induced in said first and second winding means having a component of a given fundamental flyback oscillation frequency and a component of a harmonic frequency thereof, said transformer being tuned by means of said leakage inductance approximately to said harmonic frequency, an auxiliary winding having first and second terminals and wound on said core in loose magnetic coupling relationship with said first and second winding means, said auxiliary winding being positioned on said core so that a voltage of substantially zero net fundamental frequency component is induced therein and wherein the harmonic frequency components are additive to produce a net induced voltage of substantially said harmonic frequency component, means connecting said auxiliary winding first terminal to said tap on said second winding portion thereby to provide a net voltage between said auxiliary winding second terminal and said first output terminal in which said harmonic frequency components are substantially cancelled and a net voltage between said auxiliary winding second terminal and said second output terminal in which said harmonic frequency components are additive.

12. Apparatus for producing a sawtooth deflection current in a cathode ray tube deflection coil, said apparatus comprising a transformer having a core of magnetic material, winding means provided on said core and comprising a first winding portion and a second winding portion, said transformer having a leakage inductance determined by the leakage flux occurring between the windings of said transformer, input means coupled to said first winding portion for supplying a periodically interrupted current flow in said winding means whereby a flyback pulse is induced therein having a given fundamental flyback oscillation frequency and a harmonic frequency thereof, said transformer being tuned by means of said leakage inductance to said harmonic frequency, an auxiliary winding wound on said core so as to comprise first and second effective winding portions, each of said first and second effective winding portions having induced therein a voltage having a component at said fundamental oscillation frequency and a component at said harmonic frequency, said first and second winding portions being effectively connected in series opposition so that said fundamental frequency components cancel one another thereby to produce a voltage across said auxiliary winding substantially of said harmonic frequency only, and means connecting said auxiliary winding in series with said second winding portion in a sense to produce a resultant voltage across the series combination thereof in which the harmonic frequency components are additive.

References Cited by the Examiner

UNITED STATES PATENTS

| | | | |
|---|---|---|---|
| 1,738,760 | 12/1929 | Crouse | 333—76 |
| 2,149,077 | 2/1939 | Vance | 333—76 |
| 2,272,712 | 2/1942 | Johnson | 333—77 |
| 2,278,620 | 4/1942 | Merxell | 333—76 |
| 2,570,701 | 10/1951 | Martin | 333—76 |
| 2,694,177 | 11/1954 | Sola | 333—76 |
| 2,707,773 | 5/1955 | Craham | 333—76 |
| 2,805,384 | 9/1957 | Janssen | 323—61 |
| 2,825,024 | 2/1958 | Berghoff | 323—61 |
| 2,825,849 | 3/1958 | Lufkin et al. | 315—27 |
| 2,914,721 | 11/1959 | Kohn | 323—60 |

FOREIGN PATENTS

| | | |
|---|---|---|
| 723,510 | 2/1955 | Great Britain. |

LLOYD McCOLLUM, *Primary Examiner.*

HERMAN K. SAALBACH, *Examiner.*